Patented May 9, 1950

2,506,636

UNITED STATES PATENT OFFICE 2,506,636

INSECTICIDAL DUSTS CONTAINING 2,2-BIS (4 - METHOXYPHENYL)-1,1,1-TRICHLORO-ETHANE AND PROCESS FOR MAKING SAME

Albert L. Flenner, Wilmington, Del., assignor to E. I. du Pont de Nemours & Company, Wilmington, Del., a corporation of Delaware No Drawing. Application July 16, 1946, Serial No. 683,987

7 Claims. (Cl. 167—30)

This invention relates to insecticides containing 2,2-bis-(4-methoxyphenyl)-1,1,1-trichloroethane. It is directed more particularly to dusts and water-dispersible powders comprising a dispersed system containing essentially 2,2-bis-(4-methoxyphenyl)-1,1,1-trichloroethane and an adsorbent powder, the particles of the dispersed system having an average size less than about 5 microns. The invention also relates to processes for the manufacture of these compositions and to methods for employing the compositions in insect control.

2,2-bis-(4 - methoxyphenyl) - 1,1,1 - trichloroethane, which will be referred to hereinafter as di(methoxyphenyl)-trichloroethane, is a solid melting at 89–89.5° C. after recrystallization, but before purification it normally has a melting point range of from about 78 to about 85° C. when prepared by the condensation of anisole and chloral. The product has a waxlike, adhesive property which in combination with its relatively low melting point has caused difficulties in the preparation of finely divided insecticidal dusts particularly in the preparation of highly effective dust compositions containing the product in concentrations in excess of 50 per cent by weight.

It is an object of this invention to provide finely divided insecticidal dusts and water-dispersible powders containing di(methoxyphenyl)trichloroethane. It is a further object to provide dusts and water-dispersible powders containing di(methoxyphenyl)trichloroethane and an adsorbent powder in a dispersed system wherein the particles of the di(methoxyphenyl)trichloroethane-adsorbent powder system have an average size less than about 5 microns. It is a still further object to provide free-flowing dusts and water-dispersible powders containing up to about 90 per cent by weight of di(methoxyphenyl)trichloroethane. Further objects will become apparent hereinafter.

The foregoing and other objects of the invention are attained by means of compositions comprising a dispersed system consisting essentially of di(methoxyphenyl)trichloroethane and an adsorbent powder in which the particles of the dispersed system have an average size less than about 5 microns.

The dispersed system having an average particle size less than about 5 microns, which system is an essential feature of the compositions of this invention, may be prepared by suspending a mixture of di(methoxyphenyl)trichloroethane and an adsorbent powder in a high velocity gas stream and pulverizing the di(methoxyphenyl)trichloroethane-adsorbent powder mixture to an average particle size less than about 5 microns by impact and attrition of the suspended particles against one another and against the walls of the pulverizing chamber employed.

The essential components of the dispersed system are di(methoxyphenyl)trichloroethane and an adsorbent powder. The di(methoxyphenyl)-trichloroethane suitable for use in the processes of the invention may be the highly refined pure product or the crude product normally having a melting point between 78 and 85° C. which may be obtained by the condensation of two moles of anisole with one mole of chloral. Processes for the manufacture of this product are fully disclosed in co-pending applications Serial Nos. 687,610 (now Patent No. 2,477,665) and 699,595, now Patent No. 2,484,056, filed August 1, 1946, and September 26, 1946, respectively.

The adsorbent powders which may be employed in preparing the dispersed systems and compositions of the invention are those pulverulent solids which have the characteristic of causing a particulate, soft, waxlike solid to adhere to their surfaces. Typical of such adsorbent powders are fuller's earth, tricalcium phosphate, magnesium carbonate, dicalcium phosphate, diatomaceous earths, kieselguhr, chalk, charcoal, walnut shell flour, other nut shell flours, and wood flour. These adsorbent powders are used to provide dispersed systems of this invention containing as much as 60 per cent di(methoxyphenyl)trichloroethane by weight. To obtain compositions containing larger concentrations of di(methoxyphenyl)trichloroethane, adsorbent powders having a lower bulk density are used.

In preparing dispersed systems containing about 60 to 90 per cent di(methoxyphenyl)trichloroethane by weight, it is necessary to employ an adsorbent powder which is an inorganic siliceous material having a bulk density less than 0.15 gram per cc. Such low bulk density material may generally be used in conjunction with the aforementioned adsorbent powders but may, of course, be used as the sole adsorbent powder if so desired.

Suitable inorganic siliceous adsorbent powders having a bulk density below 0.15 gram per cc. are Santocel 45 and Santocel 58, silica aerogels sold by the Monsanto Chemical Company; "Super-Absorbit," an expanded vermiculite; silicic acid of the special bulky grade supplied by the Mallinckrodt Company; hammer-milled finely pulverized asbestos; Celite 209, a diatomaceous earth sold by the Johns-Manville Company; and the calcium silicates sold under the name of "Silene."

The term "bulk density" as used in connection with the aforementioned inorganic siliceous adsorbent materials is the weight in grams of one cubic centimeter of loose, dry material measured without packing. This physical characteristic of fine powders is also referred to in the literature as "apparent density." The technique of making bulk density or apparent density determinations is set out, for example, in Gardner "Physical and Chemical Examinations of Paints, Varnishes, Lacquers, and Colors," 9th edition, 1939, page 279.

One skilled in the art will with the provision of the above list of adsorbent materials and with an understanding of the described requirements and functions of the powders employed in preparing the dispersed systems of this invention readily know the type of materials which will serve as adsorbent powders. If there is a question as to the suitability of a selected powder to function as an adsorbent, such suitability may be readily determined by the following simple test to which all the above-mentioned adsorbent powders respond:

Take 100 grams of the powdered material to be evaluated. This material should have an average particle size of not more than about 50 microns. While agitating the powder vigorously, add to it 100 grams of molten di(methoxyphenyl) trichloroethane heated to a temperature between about 90 and 115° C. to obtain a homogeneous dispersion of the molten material in the powder. In other words, the rate of addition of the molten di(methoxyphenyl) trichloroethane and the agitation should be coordinated and the agitation continued until the molten di(methoxyphenyl) trichloroethane is uniformly dispersed thruout the powder. The agitation is then stopped and the mix is allowed to cool so that the molten di(methoxyphenyl) trichloroethane solidifies. If the mix after cooling to about room temperature can be readily poured from the container as a free-flowing dust having finely divided discrete particles, then the diluent under evaluation is said to be an adsorbent powder according to the usage employed herein. If, on the other hand, the cooled mix is not free flowing, contains gummy agglomerates, or is a non-pulverulent solid mass, then the diluent is said to be non-adsorbent.

Powders which are of the non-adsorbent type and which are therefore not suitable in preparing the dispersed systems of the invention are of the class illustrated by the following typical examples: talc, pyrophyllite, bentonite, kaolin, gypsum, pumice stone, and mica.

The non-adsorbent materials may, of course, be used as diluents for the di(methoxyphenyl) trichloroethane-adsorbent powder dispersed systems and as such may be added to the di(methoxyphenyl) trichloroethane-adsorbent powder mixture either before pulverizing or may, alternatively, be mixed with the dispersed system after it has been reduced to a particle size less than about 5 microns.

The di(methoxyphenyl) trichloroethane and adsorbent powder as above described are intimately mixed and subjected to attrition in order to provide the dispersed systems of the invention. The attrition required to produce the dispersed system having an average particle size less than about 5 microns may be suitably attained by use of the fluid energy type grinding means known as air attrition mills or jet pulverizers. In such pulverizing devices the mixture of di(methoxyphenyl) trichloroethane and adsorbent powder is suspended and buffeted in a high velocity gas stream whereby there occurs the required attrition or abrasion of the particles on each other and on the walls of the pulverizing equipment.

Air attrition mills which are particularly suited for preparing the dispersed systems of the compositions of this invention are those of the type described in detail in U. S. Patents 2,032,827, 2,219,011, and 2,284,746.

In order that the dispersed system prepared in the pulverizing step be uniform with respect to di(methoxyphenyl) trichloroethane content, the mixture of di(methoxyphenyl) trichloroethane and adsorbent powder fed to the pulverizer unit should be uniform. This uniformity of the feed mixture may be obtained by thoroly mixing the di(methoxyphenyl) trichloroethane and the adsorbent powder and this mixing may be attained in various ways such as thru the use of the common mixing or blending devices, such as ribbon blenders, ball mills, and various types of grinding equipment.

A preferred process for preparing the mixture to be used as feed to the pulverizer comprises adding molten di(methoxyphenyl) trichloroethane to the adsorbent powder having an average particle size less than about 50 microns while agitating the powder, followed, if desired, by grinding in a suitable mill, such as a Mikro-Pulverizer, whereby there is obtained a homogeneous mixture consisting of di(methoxyphenyl) trichloroethane dispersed on the adsorbent powder. This process for obtaining a mixture of di(methoxyphenyl) trichloroethane dispersed on an adsorbent powder, which mixture may be used as the starting material in processes for obtaining a dispersed system having an average particle size less than about 5 microns, is set out fully and in detail in my copending application Serial No. 683,988, filed July 16, 1946.

Alternatively, a suitable mixture for feed to the pulverizer may be obtained by mixing particulate di(methoxyphenyl) trichloroethane and and adsorbent powder having an average particle size less than about 50 microns in a mixing device such as a ribbon blender, grinding the mixture in a hammer mill, and then mixing the ground material again to insure uniformity.

As has been set out above, the compositions of this invention are characterized by containing a mixture consisting essentially of di(methoxyphenyl) trichloroethane and an adsorbent powder in a dispersed system, the particles of the dispersed system having an average size less than about 5 microns. By the term "dispersed system" it is meant that the mixture of the di(methoxyphenyl) trichloroethane and the adsorbent powder is such that the mixture is apparently a single substance rather than a mixture of discrete particles of di(methoxyphenyl) trichloroethane and adsorbent powder. In those compositions of the invention where di(methoxyphenyl) trichloroethane is present in large excess over the adsorbent powder, some of the di(methoxyphenyl)-trichloroethane may be present as discrete particles. For the most part, however, the di(methoxyphenyl)trichloroethane adheres to the surfaces and is imbedded in the pores of the adsorbent powder so that the mixture appears to consist principally of extremely small particles of a single substance.

While the dispersed system of this invention consists essentially of di(methoxyphenyl)trichloroethane and an adsorbent powder, it is understood that such materials as wetting agents and dispersing agents may be pulverized with the di(methoxyphenyl)trichloroethane-adsorbent powder mixture and that when this is done the added agents also become in a large measure dispersed in and on the dispersed system and do, for all practical purposes, become a part of the dispersed system.

I have found that the compositions of this invention comprising a dispersed system having an average particle size less than 5 microns and containing di(methoxyphenyl)trichloroethane and and adsorbent powder are markedly more effective in insect control than dust compositions having an average particle size in excess of 5 microns or dust compositions which comprise essentially a mixture of discrete particles of di(methoxyphenyl)trichloroethane and a powdered inert carrier. Thus the improved effectiveness of the compositions of the invention is believed to result from the physical characteristics of the dispersed system and the particle size of the system.

By the use of the expression "average particle size less than about 5 microns" or "particles having an average size less than about 5 microns" it is meant that the average effective diameter of the particles of the dispersed system is less than about 5 microns.

The average effective diameter of a powdered material is numerically equal to six times the total volume of the material divided by the total surface of all the particles. The average effective diameter of the particles of the dispersed system of this invention, or, in other words, the average particle size of the dispersed system may be determined by use of an air permeability method of determining the particle size of powdered materials. The Fisher Sub-Sieve Sizer is a particularly suitable apparatus employing the air permeability method for use in determining the average effective diameter or average particle size of extremely finely ground material. Of course, other methods of determining average particle size will be apparent to one skilled in the art. For example, determination of average particle size by microscopic examination and measurement may be employed.

Having thus set out the basic concepts and essentials of the invention, such as the method to be employed in preparing the dispersed systems which are essential to the compositions of the invention, and having defined precisely what is intended by use of the expressions "di(methoxyphenyl) trichloroethane," "adsorbent powder," "dispersed system," and "average particle size less than about 5 microns," there follows a description of a preferred embodiment of the invention.

While compositions within the scope of the invention may comprise dispersed systems containing from about 1 to 90 per cent di(methoxyphenyl) trichloroethane, a preferred embodiment of the invention embraces compositions comprising a dispersed system consisting of about 50 to 60 per cent by weight di(methoxyphenyl) trichloroethane and essentially all the remainder of the system an adsorbent powder, the particles of the dispersed system having an average size less than about 5 microns. These compositions are prepared by subjecting to attrition preferably in an air attrition mill an intimate mixture of di(methoxyphenyl) trichloroethane and adsorbent powder, in the proportions of about 50 to 60 parts by weight of the di(methoxyphenyl) trichloroethane and at least 40 parts by weight of an adsorbent powder to obtain a mixture which is a dispersed system consisting essentially of di(methoxyphenyl) trichloroethane and adsorbent powder, the particle size of the dispersed system being less than about 5 microns.

In this preferred embodiment of the invention, one may also add small amounts of a wetting agent, a dispersing agent, or similar conditioning agent to the mixture of di(methoxyphenyl) trichloroethane and adsorbent powder before pulverizing and thus obtain as the product from the attrition step a di(methoxyphenyl) trichloroethane-adsorbent powder-wetting agent-dispersing agent dispersed system having an average particle size less than about 5 microns. Alternatively, such wetting, dispersing, and conditioning agents may be omitted from the attrition step and merely mixed and blended with the di(methoxyphenyl) trichloroethane-adsorbent powder dispersed system after the latter has been prepared.

The dispersed system of this embodiment, consisting of about 50 to 60 per cent by weight di(methoxyphenyl) trichloroethane and essentially all the remainder of the system an adsorbent powder and containing additionally, if so desired, a wetting agent and a dispersing agent, may be then diluted or modified by simple mixing or blending with further amounts of adsorbent powder, non-adsorbent powder, other insecticides, fungicides, bactericides, or combinations of these various materials to obtain dusts or water-dispersible compositions suited for a variety of methods of application and use.

In these preferred compositions of the invention as with all compositions of the invention comprising a dispersed system consisting essentially of di(methoxyphenyl) trichloroethane and the adsorbent powder, the particles of the dispersed system having an average size less than about 5 microns, it is not required that the entire composition have an average particle size less than about 5 microns. The improved utility of the compositions of the invention stem from the dispersed system, the particles of which have an average size less than about 5 microns. Thus compositions of this invention may comprise mixtures of the dispersed system having an average particle size less than about 5 microns with various other materials and the latter materials may, of course, have larger particle sizes.

In another preferred embodiment of the invention, the dispersed system consists essentially of about 60 to about 90 per cent by weight di(methoxyphenyl) trichloroethane and an adsorbent powder, said adsorbent powder containing an inorganic siliceous material having a bulk density less than about 0.15 gram per cc. in an amount corresponding to at least 0.25 per cent by weight of the dispersed system for each one per cent by weight of di(methoxyphenyl) trichloroethane in the system over 60 per cent by weight, the dispersed system characterized by having an average particle size less than about 5 microns.

In preparing the dispersed system containing from about 60 to about 90 per cent by weight of di(methoxyphenyl) trichloroethane, one may use as the adsorbent powder solely an inorganic siliceous material having a bulk density less than about 0.15 gram per cc. This is generally not necessary and it is preferable for economic reasons to employ as the adsorbent powder a mixture of a higher bulk density adsorbent material such as fuller's earth and others which have been set out heretofore, and an inorganic siliceous material. The amount of the inorganic siliceous material required to prepare the dispersed system satisfactorily increases as the amount of di(methoxyphenyl)trichloroethane included in the dispersed system is increased. The minimum amount of inorganic siliceous material required in such preparation is about 0.25 per cent by weight for each 1 per cent by weight of di(methoxyphenyl)trichloroethane in the system over 60 per cent by weight.

In preparing the dispersed system containing about 60 to about 90 per cent by weight of di(methoxyphenyl)trichloroethane, the components — di(methoxyphenyl)trichloroethane and the adsorbent powder containing the inorganic siliceous material—are first intimately mixed and the mixture subjected to impact and attrition preferably in an air attrition mill to obtain a dispersed system consisting of the three components, the particles of the system having an average size less than about 5 microns.

Alternatively, there may be added to the mixture before attrition a wetting agent and a dispersing agent and other similar conditioning agents if so desired so that the dispersed system obtained after attrition also contains the wetting and dispersing agents and may be readily dispersed in water. When wetting or dispersing agents are so employed, it is generally not necessary or desirable that the total amount so employed be in excess of about 5 per cent by weight of the dispersed system.

The dispersed systems of the invention containing about 60 to about 90 per cent by weight of di(methoxyphenyl)trichloroethane either with or without wetting and dispersing agents are free flowing even after extended storage periods and are particularly useful since in addition to being more effective in the control of insects per unit of di(methoxyphenyl)trichloroethane applied than the powdered compositions heretofore available, they require less shipping and storage space and economies are also effected in shipping and handling costs. These powdered, dispersed systems can, of course, be readily mixed with the various diluent powders used in the art or with other pest control agents by a simple mixing or blending operation. The dispersed systems containing wetting and dispersing agents may, of course, be readily dispersed in water to form a relatively stable suspension of the solid particles in the water and the suspension so obtained may be applied by the usual agricultural spray equipment.

Among the dispersing agents suitable for inclusion in the water-dispersible compositions of this invention are goulac, the naphthalene formaldehyde condensation products such as Daxad No. 11, and the polymeric hydroxylated materials such as polyvinyl alcohol, methylcellulose, Daktose, and saponin.

Suitable wetting agents for inclusion in the water-dispersible compositions of the invention are the sodium alkonaphthalene sulfonates such as Alkonol B, the sodium alkylsulfates such as IN-181, sulfated hydrocarbons such as Aresklene 400, Alkanol B, Nacconol NR and Igepon T, and sodium lignin sulfonate. Numerous other suitable wetting and dispersing agents are listed in detail in Bulletin E-607 of the Bureau of Entomology and Plant Quarantine of the U. S. Department of Agriculture.

The compositions of the invention may include other insect toxicants such as metallic arsenates, fluosilicates, hexachlorocyclohexanes, phenothiazine, organic thiocyanates such as n-dodecyl thiocyanate, fenchyl thiocyanoacetate and beta (thiocyanoethyl) beta(butoxyethyl) ether, nicotine, anabasine (neo-nicotine), nor-nicotine, rotenone and its congeners, sabadilla, ryania, hellebore, pyrethrum, N - isobutylundecylenamide, and aminomethyl sulfides.

The compositions may also contain bactericides and fungicides such as sulfur, polysulfides such as lime-sulfur, the chlorinated phenols, aminomethyl sulfides, copper acylacetonates, copper chelates of beta-keto acids and esters, copper chelates of salicylaldehyde, Burgundy mixture, Bordeaux mixture, the so-called insoluble coppers such as basic copper sulfates, copper oxychlorides, copper calcium chlorides, copper oxides, copper silicates, copper zeolites, and copper thiocyanates, the long-chain quaternary ammonium halides and metallic derivatives of dithiocarbamic acid such as ferric dimethyldithiocarbamate.

The invention is illustrated by the following examples:

*Example 1*

Two hundred (200) parts by weight of pulverized di(methoxyphenyl)trichloroethane having a melting point of 82° C. is mixed in a ribbon mixer with 200 parts by weight of diatomaceous earth having an average particle size of less than 20 microns. After mixing for about 15 minutes, the mixture is then passed thru a hammer mill to provide a still more intimate mixture.

The di(methoxyphenyl)trichloroethane-diatomaceous earth mixture is then subjected to impact and attrition in an air attrition mill of the type shown in Figure 6 of Kidwell Patent 2,219,011 to obtain a free-flowing dust composition consisting of a di(methoxyphenyl)trichloroethane-diatomaceous earth dispersed system having an average particle size of about 3 microns.

The dispersed system prepared according to this example may be applied as a dust for the control of insects in the form in which it is obtained from the air attrition mill. Alternatively, it may be diluted to lower concentrations by mixture with adsorbent or non-adsorbent powders. It may also be mixed with other insecticidal adjuvants such as wetting and dispersing agents and with other insecticidal toxicants and fungicides to provide various compositions suited for application in the control of pests.

*Example 2*

Two hundred (200) parts by weight of di(methoxyphenyl)trichloroethane having a melting point of 85° C. and pulverized to a particle size of about 40 microns is mixed in a ribbon mixer with 186 parts by weight of fuller's earth having an average particle size of less than 20 microns, 12 parts by weight of goulac, and 2 parts by weight of Alkanol B, a sodium alkylnaphthalene sulfonate. This mixture after being blended to give a homogeneous material is passed thru an air attrition mill of the type shown in Figure 3 of Andrews Patent 2,032,827 to obtain a free-flowing, water-dispersible powder consisting of a di(methoxyphenyl)-trichloroethane-fuller's earth - goulac-Alkanol B dispersed system, the particles of which have an average size of about 3.5 microns.

The composition of this example may be applied as a dust but preferably it is dispersed in water to a desired concentration and applied by means of the usual insecticide spray equipment. The dispersed system of this example may, of course, as with the dispersed systems of the invention, be mixed with inert powdered diluents, insecticides, fungicides, bactericides, and other conditioning agents to provide a variety of water-dispersible powders.

*Example 3*

Three hundred (300) parts by weight of powdered di(methoxyphenyl) trichloroethane having a melting point at about 81° C. is mixed in a ribbon mixer with 44 parts by weight of fuller's earth having an average particle size of less than 20 microns, 40 parts by weight of Santocel 58, a silica aerogel having a bulk density of about 0.12 gram per cc., 8 parts by weight of IN-181P which is principally sodium lauryl sulfate, and 8 parts by weight of saponin. After mixing for about 15 to 30 minutes, the mixture is further blended by passing it thru a hammer mill of the Mikro-Pulverizer type.

The intimately blended mix is then subjected to attrition in an air attrition mill to obtain a dispersed system having an average particle size of about 4 microns.

The dispersed system obtained according to this example is a free-flowing powder which wets readily in water and is readily suspended therein to form an aqueous suspension for application in insect control.

*Example 4*

To a mixture of 186 parts by weight of fuller's earth having an average particle size of less than 20 microns, 12 parts by weight of Lukanol, a sulfonated condensation product of formaldehyde and naphthalene, and 2 parts by weight of Aresklene, a sodium disulfonate of di(butylphenyl) phenol, there is added with agitation 200 parts by weight of fused di(methoxyphenyl) trichloroethane heated to about 95° C. The rate of agitation of the fuller's earth and the rate of addition of the fused toxicant to the fuller's earth are coordinated so that the mixture remains pulverulent thruout the mixing operation. The mixing is continued after all the toxicant has been added until the temperature of the mix has cooled to about 50° C. The free-flowing powder so obtained is comminuted in an air attrition mill to an average particle size of about 3 microns.

The dispersed system of this example is used preferably by dispersing it in water and applying it to the area to be treated by means of a spray of the aqueous suspension although, of course, it may be applied as a dust either as is or after mixture with inert powdered diluents or other insecticidal adjuvants, insecticides, fungicides, or bactericides.

I claim:

1. In a process for the manufacture of a solid particulate dispersed system containing essentially 2,2-bis-(4-methoxyphenyl)-1,1,1-trichloroethane and an adsorbent powder, the particles of said dispersed system having an average size less than about 5 microns, the steps comprising suspending an intimate particulate solid mixture of di(methoxyphenyl)trichloroethane and an adsorbent powder in a high velocity gas stream and pulverizing mixture therein to an average particle size less than about 5 microns by impact and attrition of the suspended particles against one another and against retaining surfaces.

2. In a process for the manufacture of a solid particulate dispersed system containing essentially 2,2-bis(4-methoxyphenyl)-1,1,1-trichloroethane and an adsorbent powder, the particles of said dispersed system having an average size less than about 5 microns, the steps comprising forming, in the absence of a solvent for di(methoxyphenyl)-trichloroethane, an intimate particulate solid mixture consisting essentially of about 50 to 60% by weight di(methoxyphenyl)trichloroethane and an adsorbent powder and suspending said intimate mixture in a high velocity gas stream and pulverizing the mixture therein to an average particle size less than about 5 microns by impact and attrition of the suspended particles against one another and against retaining surfaces.

3. In a process for the manufacture of a solid particulate dispersed system containing essentially 2,2,-bis(4-methoxyphenyl)-1,1,1-trichloroethane and an adsorbent powder, the particles of said dispersed system having an average size less than about 5 microns, the steps comprising forming, in the absence of a solvent for di(methoxyphenyl)trichloroethane, an intimate particulate solid mixture consisting of about 50 to 60% by weight di(methoxyphenyl)trichloroethane, at least one conditioning agent from the group consisting of wetting agents and dispersing agents, the total amount of such conditioning agent in the mixture not exceeding about 5% by weight, and the remainder fuller's earth; and suspending said intimate mixture in a high velocity gas stream and pulverizing the mixture therein to an average particle size less than about 5 microns by impact and attrition of the suspended particles against one another and against retaining surfaces.

4. In a process for the manufacture of a solid particulate dispersed system containing essentially 2,2-bis(4-methoxyphenyl)-1,1,1-trichloroethane and an adsorbent powder, the particles of said dispersed system having an average size less than about 5 microns, the steps comprising forming, in the absence of a solvent for di(methoxyphenyl)trichloroethane, an intimate particulate solid mixture consisting of about 60 to about 90% by weight di(methoxyphenyl)trichloroethane, at least one conditioning agent from the group consisting of wetting agents and dispersing agents, the total amount of such conditioning agent in the mixture not exceeding about 5% by weight, and the remainder an adsorbent powder, said adsorbent powder containing an inorganic siliceous material having a bulk density less than about 0.15 gram per cc. in amount corresponding to at least 0.25% by weight of said intimate mixture for each 1% by weight of di(methoxyphenyl)trichloroethane in the mixture over 60% by weight; and suspending said intimate mixture in a high velocity gas stream and pulverizing the mixture therein to an average particle size less than about 5 microns by impact and attrition of the suspended particles against one another and against retaining surfaces.

5. An insecticidal composition comprising a dispersed system prepared according to the process of claim 1.

6. An insecticidal composition comprising a dispersed system prepared according to the process of claim 2.

7. An insecticidal composition comprising a dispersed system prepared according to the process of claim 4.

ALBERT L. FLENNER.

REFERENCES CITED

The following references are of record in the file of this patent:

UNITED STATES PATENTS

| Number | Name | Date |
|---|---|---|
| 2,060,210 | Heckert | Nov. 10, 1936 |
| 2,161,462 | Flenner | June 6, 1939 |
| 2,207,737 | Hooft | July 16, 1940 |
| 2,218,031 | Reichert | Oct. 15, 1940 |
| 2,257,545 | Curtis | Sept. 30, 1941 |
| 2,420,928 | Bousquet | May 20, 1947 |

FOREIGN PATENTS

| Number | Country | Date |
|---|---|---|
| 348,184 | Great Britain | May 8, 1931 |
| 547,874 | Great Britain | Sept. 15, 1942 |
| 446,935 | Belgium | Sept. 30, 1942 |

OTHER REFERENCES

Science, May 4, 1945, vol. 101, No. 2627, pages 464–465, by Prill et al.